United States Patent [19]

Asthana et al.

[11] Patent Number: 5,134,711
[45] Date of Patent: Jul. 28, 1992

[54] COMPUTER WITH INTELLIGENT MEMORY SYSTEM

[75] Inventors: Abhaya Asthana, Berkeley Heights; Jonathan A. Chandross, Murray Hill; Hosagrahar V. Jagadish, Berkeley Heights; Scott C. Knauer, Mountainside; Daniel Lin, Berkeley Heights, all of N.J.

[73] Assignee: AT&T Bell Laboratories, Murray Hill, N.J.

[21] Appl. No.: 193,987

[22] Filed: May 13, 1988

[51] Int. Cl.⁵ .................................................. G06F 13/00
[52] U.S. Cl. ........................... 395/800; 364/DIG. 1; 364/232.2; 364/238.4; 364/245; 395/325
[58] Field of Search ... 364/900 MS File, 200 MS File; 395/325, 275, 800, 425

[56] References Cited

U.S. PATENT DOCUMENTS

| | | | |
|---|---|---|---|
| 3,593,304 | 7/1971 | Gardner et al. | 364/900 |
| 3,609,702 | 9/1971 | Gardner et al. | 364/900 |
| 3,699,534 | 10/1972 | Kautz | 364/900 |
| 3,753,238 | 8/1973 | Tutelman | 364/200 |
| 3,757,312 | 9/1973 | Shore et al. | 364/200 |
| 3,787,817 | 1/1974 | Goldberg | 364/200 |
| 3,962,706 | 6/1976 | Dennis et al. | 364/900 |
| 4,068,305 | 1/1978 | Cutter | 364/200 |
| 4,149,240 | 4/1979 | Misunas et al. | 364/200 |
| 4,580,215 | 4/1986 | Morton | 364/200 |
| 4,731,737 | 3/1988 | Witt et al. | 364/200 |
| 4,819,152 | 4/1989 | Deerfield et al. | 364/200 |
| 4,959,776 | 9/1990 | Deerfield et al. | 364/200 |

FOREIGN PATENT DOCUMENTS

| | | |
|---|---|---|
| 0166268 | 1/1986 | European Pat. Off. |
| 8702155 | 4/1987 | PCT Int'l Appl. |
| 8909967 | 10/1989 | PCT Int'l Appl. |

OTHER PUBLICATIONS

Cyre, W. R. et al., WISPAC: A Parallel Array Computer for Large-Scale System Simulation, 1977, pp. 165–172.

B. W. Kernighan, et al., "*The C Programming Language,*" p. 119, Prentice-Hall, 1978.

"An Architecture for Doing Concurrent Systems Research" AFIPS Conference Proceedings, Jul. 15, 1985, Chicago, Ill., USA, pp. 267–277, V. P. Srini.

Primary Examiner—Kevin A. Kriess
Attorney, Agent, or Firm—Henry T. Brendzel

[57] ABSTRACT

A programmable memory system that interfaces with a computer's control and data manipulation units, and is capable of performing the manipulation, bookkeeping, and checking that would normally be performed by the computer. The memory system comprises active structure modules that are interconnected in a network to form clusters. The clusters are interconnected to form an aggregate memory system. Each ASE contains a processor section and a conventional memory section.

22 Claims, 6 Drawing Sheets

COMPUTER WITH INTELLIGENT MEMORY SYSTEM

TECHNICAL FIELD

This invention relates to computer systems, and more particularly to memory systems for use in computer systems.

BACKGROUND OF THE INVENTION

An important use for a computer system is the manipulation of data. This manipulation is sometimes of value in itself, such as organizing a mass of information into tables easily comprehensible by human beings. At other times, the data is manipulated as part of some task that the computer is performing, such as a linear programming optimization process.

The data stored in a computer's memory must be accessed by the computer's control and manipulation circuitry. Conventional memory is composed of multiple locations, each capable of storing information. Each of these locations is much like a post office box. To use the contents of a particular box, you must know its unique identifying number or address. Whenever the computer requires a piece of data, it must know in which location(s) of memory the required data resides. The computer then specifies the address(es) of the appropriate location(s) to the memory, which, in turn, furnishes the computer with the data present in those location(s). Thus, the memory serves as a passive repository of whatever information the computer wishes to place in it.

A computer performs useful tasks by executing programs that are written for it. These programs must have knowledge of the data to be accessed and manipulated as part of the task at hand. Artisans who write these programs have an organizational scheme of data in their minds, but they frequently find it inconvenient to assign unique names or numbers to each elementary piece of data associated with a program at hand. Instead, programmers often organize the data into groups called data structures, a few common ones of which are described below.

One common data structure is a stack. In a stack, items are placed on "top" of one another like trays in a cafeteria. When an item is to be read from the stack, it is always the one at the top of the stack that is read. Similarly, when an item is to be written, it is always "pushed" onto the top of the stack. Thus, the stack is a "last-in-first-out" (LIFO) data organization.

Another common data structure is a tree. A tree is much like a genealogical chart. In a tree, there is a single piece of data that forms the head. This piece of data is called the root. The root is the first parent, and each parent can have one or more "children" (each child being a piece of data itself), and these children have more children, and so forth. These structures are, of course, abstract entities imposed by the program upon the data, but they do have a semantic significance to the users.

Whenever a computer program operates on data organized as a stack, for example, it is forced to translate its view of the stack into the terms the memory can understand, that is, into the numbered locations, or addresses. To successfully implement a stack, the processor must be able to remember where the current top of the stack is. The address of the top of the stack is stored, in turn, in another memory location. So to read the top item in a stack, the computer must first obtain the address which identifies the top of the stack. Once that address has been located, then the actual datum at that address must be requested. Operations such as adding an item to the top of the stack, deleting an item, etc., require analogous multiple memory accesses. In fact, even more accesses might be required since a careful program ought also to check whether the stack is within the location bounds allotted to it, or whether it is approaching a point where it may manipulate a location currently allotted to a different data structure. Clearly, there is a difference between the way memory is treated as a repository for data, and the way memory locations are doled out to programs.

A programmer typically expends considerable effort keeping track of the actual memory locations involved in each data structure. This book-keeping is not only cumbersome and error-prone, it is terribly inefficient. A simple task, such as a stack access, ideally would take but a single memory access. The burden of bounds checking and storage management causes this simple task to require many more accesses to memory.

SUMMARY OF THE INVENTION

Our invention enhances the operation of computers by presenting a generalized, programmable memory system which interfaces with a computer's control and data manipulation units. This memory system is capable of performing the manipulation, book-keeping, and checking that would normally be performed by the computer. The system comprises any number of active structure modules (ASEs) that may be interconnected in a network to form memory modules. The memory modules may be interconnected to form an aggregate system comprising a closely coupled memory system. This memory system is then interfaced with the computer. Each ASE contains a processor section and a conventional memory section. The processor section might be a general purpose programmable microprocessor, or a specially designed controller that is well suited to a particular function that the memory system is expected to accomplish. Also in accordance with our invention, more than one CPU can be connected to our memory system, and the connection can effectively be achieved through a plurality of ports.

DETAILED DESCRIPTION

The concept of storing data structure elements into memory, manipulating data structure elements within memory, and retrieving data structure elements from memory has heretofore not been applied in the art of memory systems. To have a memory system that is capable of being programmed to thus operate with any chosen data structure arrangement, and have it coupled to a CPU that is no longer required to maintain a base of knowledge about the stored information is entirely novel.

Although the concept of "data structures" is well known to the computer science artisans, for purposes of this disclosure, it is useful to explicitly state what a "data structure" is. To that end, a paragraph from *The C Programming Language*, by Kernigham et al., Prentice-Hall, 1978, page 119, is quoted below:

> A structure is a collection of one or more variables, possibly of different types, grouped together under a single name for convenient handling. (Structures are called "records" in some languages, most notably Pascal.)
>
> The traditional example of a structure is the payroll record: an "employee" is described by a set of attributes such as name, address, social security number, salary, etc. Some of these in turn could be structures: a name has several components, as does an address and even salary.
>
> Structures help to organize complicated data, particularly in large programs, because in many situations they permit a group of related variables to be treated as a unit instead of as separate entities.

In accordance with the principles of our invention, a memory is provided that contains enough intelligence to allow a user to down-load information into the memory to inform it of the data structure with which the user wishes to operate, and to inform it of the basic operations of which the memory is to be cognizant. Thereafter, the CPU interacts with the memory by simply providing it with memory structure elements—to wit, the data—and/or the commands that tells the memory which of the operations the memory is to execute. Thus, the memory system of our invention, and a computer arranged with the memory system of our invention, operates in a manner that is totally analogous to the operation of conventional memories, save for the ability to program the memory for a chosen data structure and the ability to operate with data structure elements, as compared to mere "words".

Therefore, to enable skilled artisans to practice our invention, the following description is directed mostly to the structure of our memory system rather than the manner of using it.

Figure 1:
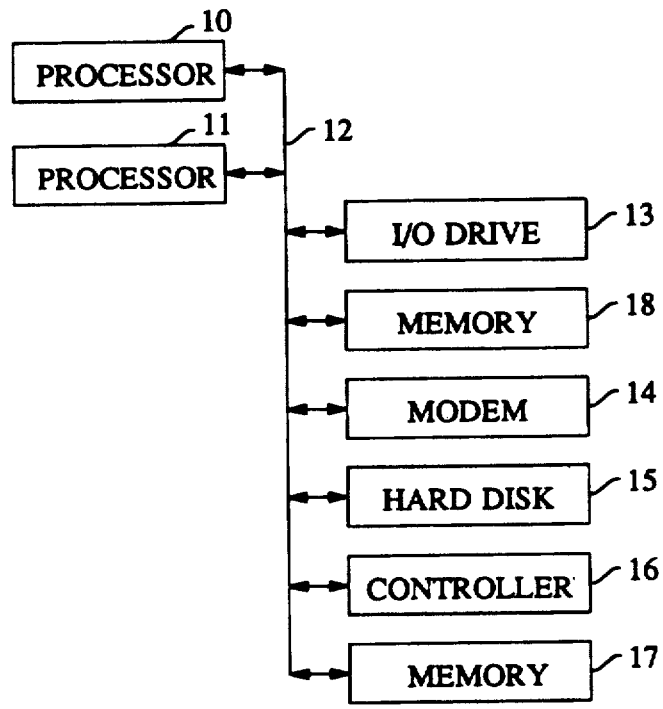
FIG. 1 depicts a prior art arrangement that includes two processors and peripheral equipment, including a memory.

FIG. 1 presents a generalized schematic diagram of a prior art multiprocessor arrangement. It includes processors 10 and 11, a common bus 12 to which processors 10 and 11 are connected, and peripheral devices 13–18. Devices 17 and 18 are memories. In operation, the processors contend for bus 12, and the processor that is successful is given access to any one of the devices connected to the bus. Such an arrangement clearly results in bus 12 being a potential bottleneck in the communication process between the processors and the devices. To alleviate the problem, some designers include a cache memory with each processor. This approach helps to reduce bus contention, but it does not solve the basic communication problem between the processor and the memory. Memory accesses still take the form of elementary fetches and stores.

Figure 2:
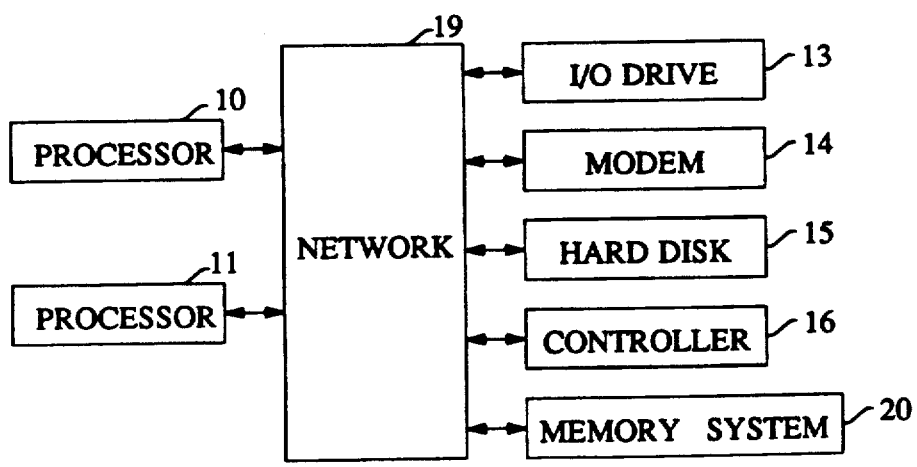
FIG. 2 presents a generalized block diagram of a computer system in accordance with the principles of our invention.

FIG. 2 presents a block diagram of a computer system in accordance with the principles of our invention. For purposes of example, it includes processors 10 and 11, and peripheral devices 13, 14, 15, and 16. In FIG. 2, the processors are connected to a switching network 19. Also, in accordance with the principles of our invention, the FIG. 2 computer system includes a memory system 20 connected to network 19. Memory system 20, unlike the memories in FIG. 1, is composed of memory modules that include ocntrolled processing and communication capabilities.

Network 19 permits one CPU to communicate with memory system 20 while another CPU is communicating with some other peripheral. Network 19 addresses the contention problem but not the low level of communication to and from the memory. The latter is addressed by the intelligence within memory system 20. It should be realized, of course, that users who do not have a contention problem (e.g., in applications where conflict is not likely to occur), network 19 can be eliminated. It should be also noted that there may often be communication between the memory system and some peripherals without the involvement of any CPU.

Figure 3:
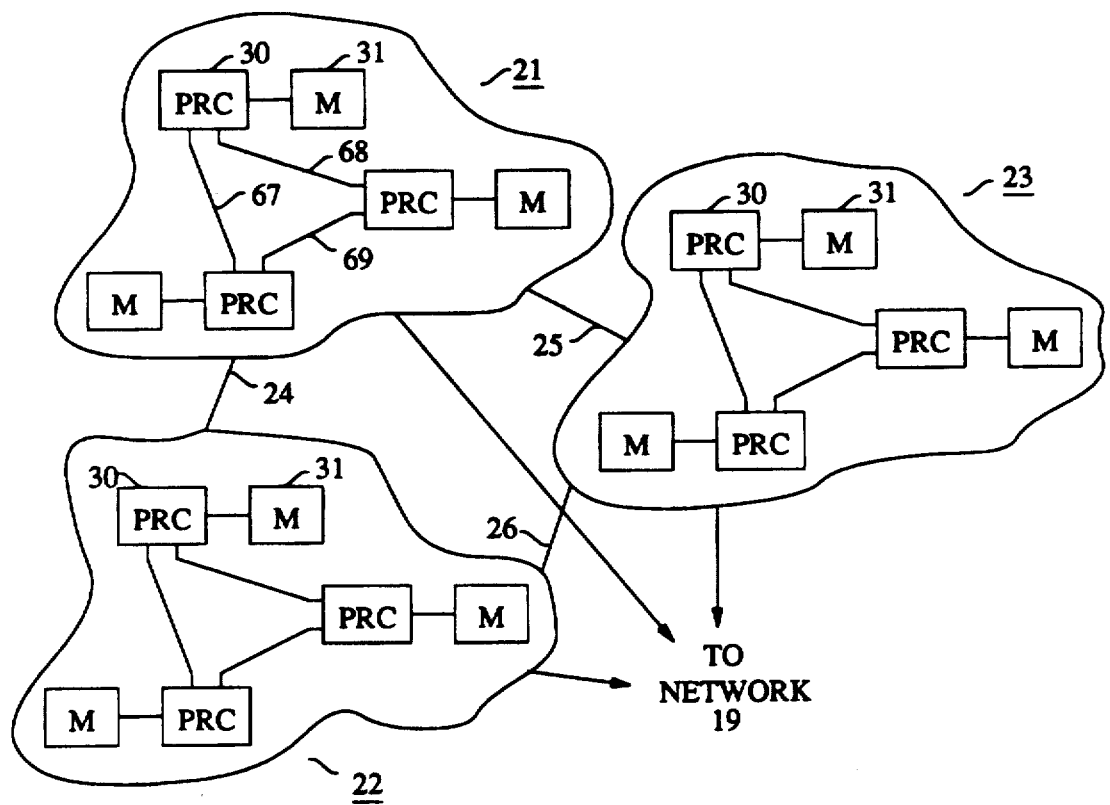
FIG. 3 presents a more detailed diagram of the memory system in FIG. 2.

FIG. 3 depicts memory 20 in somewhat greater detail. It contains memory modules 21, 22, and 23 that are interconnected with a network, such as with the network comprising communication lines 24, 25, and 26. Modules 21–23 are also connected to network 19. Each memory module contains a plurality of ASEs with each ASE containing a processor element 30 and a memory 31. Processor element 30 and associated memory 31 are an example of an ASE. The ASEs are also interconnected in a network, such as the network comprising lines 67, 68, and 69, that makes up the memory module.

Figure 4:
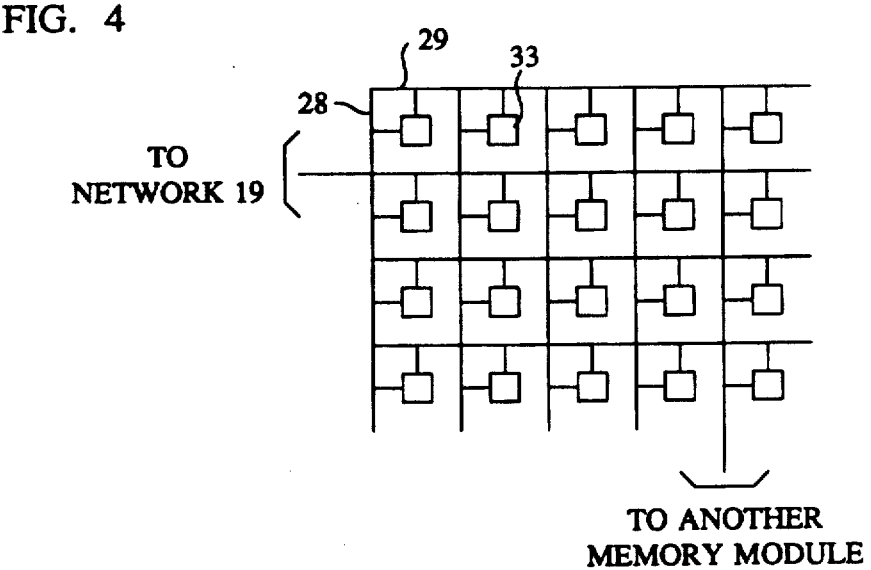
FIG. 4 describes one implementation for the network that interconnects the ASE units of memory system 20.

FIG. 4 presents one embodiment for memory module. It contains a switching fabric of bidirectional communication lines arranged, diagrammatically, in rows and columns, such as lines 28 and 29. An ASE module, such as 33, forms a "cross-point" between each row line and column line. Any of the row or column lines can be designated for communication with other ASEs, and, likewise, any row and column line can be designated for communication with network 19. Communication between ASEs in one memory module can be effected via the row and column lines in combination with passing through other ASEs in any one of a number of known ways. Most simply, communication can be effected through packets, with each packet having a destination address that, in accordance with a prescribed procedure, permits each ASE that encounters the packet to know whether or not it should transfer the packet from the row to the column, or vice versa. In that capacity, the ASE serves merely as a cross-over switch.

Figure 5:
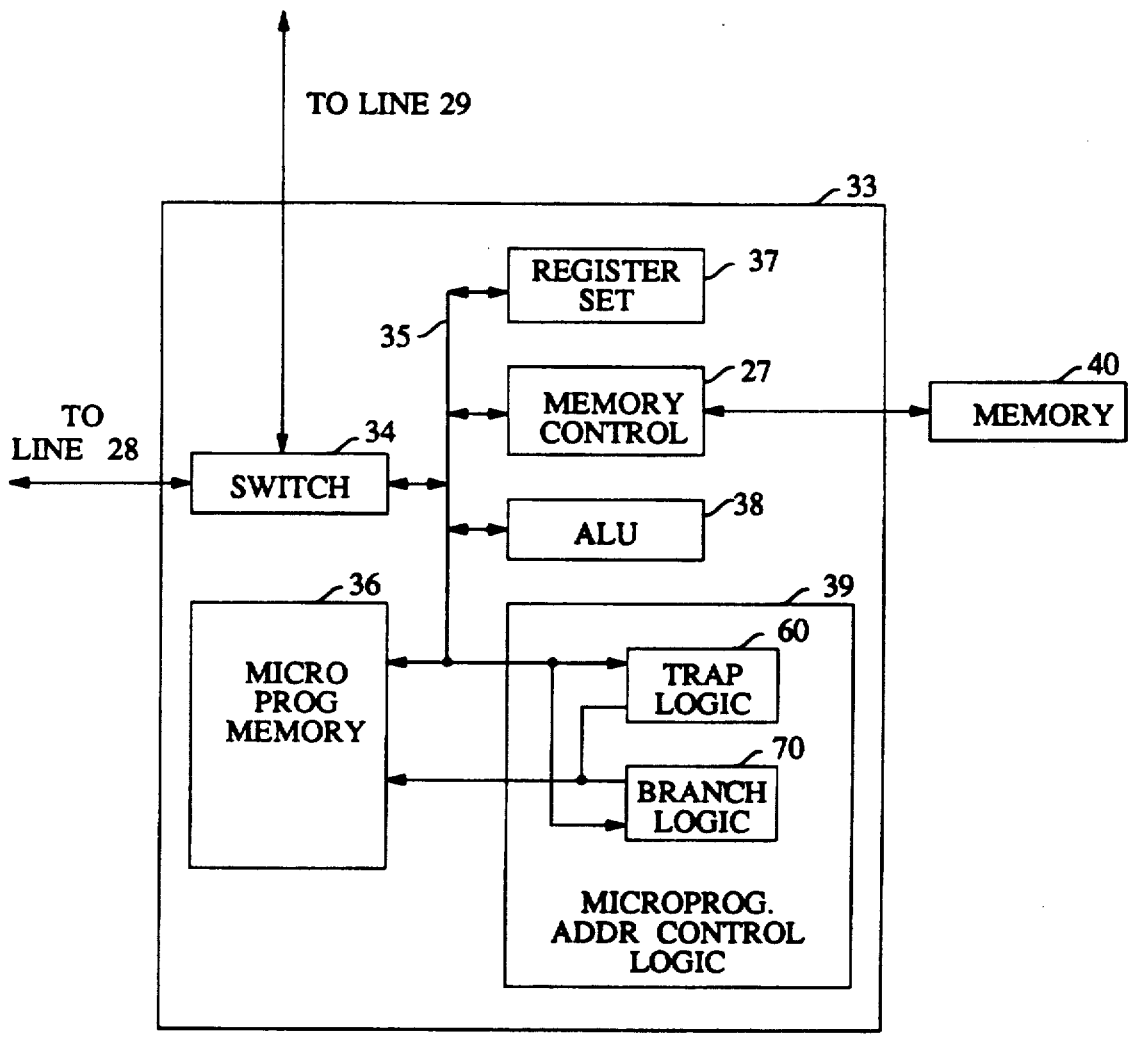
FIG. 5 presents a block diagram of an ASE unit.

FIG. 5 depicts the block diagram of one embodiment for the processing element in an ASE adapted for operating in the switching environment of FIG. 4. It contains a switch 34 connected to two ports of the processing element, which serves as the cross-over switch discussed above, and a common bus 35 to which a number of blocks are connected. Specifically, bus 35 interfaces with a microprogram memory 36, with register array 37, with arithmetic logic unit (ALU) 38, with microprogram address counter 39, and with memory control logic 27.

In operation, memory system 20 is subject to two types of access. One is to program the memory system in general, and each of the needed ASEs in particular. The programming specifies the data structures that the memory system will be required to handle and the manner of performing the required operations on these data structures. For example, one program module would define the processing that shall be expected of the ASEs, another program module would define the interaction between the different ASEs when more memory or data manipulation is needed for a particular task than is available to a particular processor module, etc. The second type of access is to instruct the memory system to actually perform the desired task. This can be, for example, to store a word of data in a LIFO stack, to access a "patent" of the last-accessed "child", etc.

Figure 6:
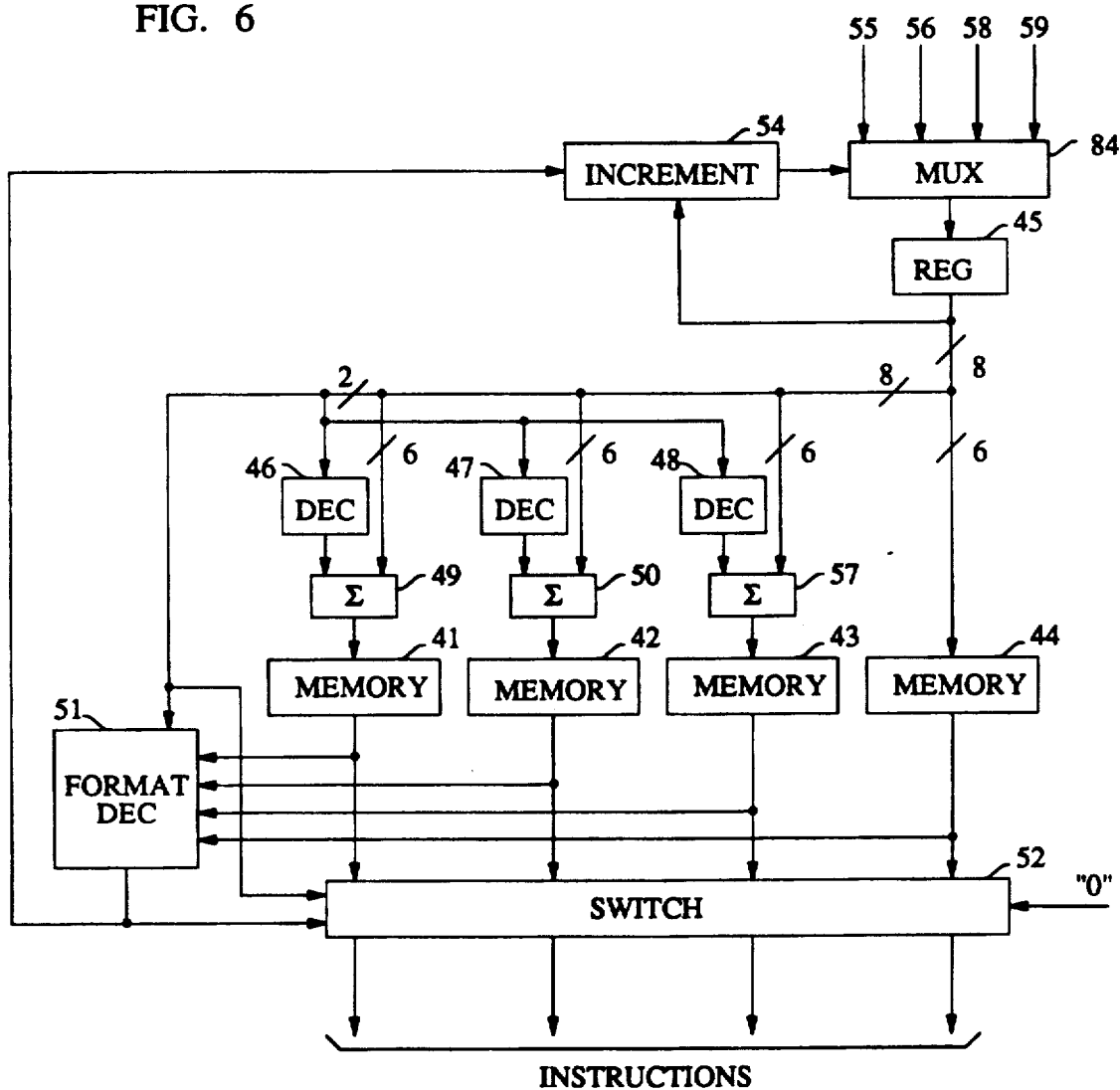
FIG. 6 depicts the microprogram memory of FIG. 5.

The intelligence that permits ASEs to perform the type of tasks mentioned above resides in microprogram memory 36. This memory is accessed under control of microprogram counter 39, and it provides the necessary control signals for effecting the necessary actions at ALU 38, register set 37, and memory 40. Memory 36 can be a conventional memory but in our preferred embodiment, microprogram memory 36 comprises four 32-bit memory modules of 256 words each, arranged as depicted in FIG. 6. The reason for this design lies in our desire to permit variable length instructions to be stored efficiently, and at the same time, to permit parallel access to the stored variable length instruction.

The conventional approach to storing variable length instructions in a program memory is to use sequential locations, with each holding some part of the instruction. When the instruction is needed, these sequential locations are read out, and the instruction is "built up" out of the successive reads. Alternatively, one can store the instructions in a memory that possesses sufficient bits to store the largest instruction, with the smaller instructions not using some bits. Such an arrangement would obviously be an inefficient use of available memory and is therefore not desirable in VLSI implementations of the ASE. In accordance with our invention, we divide the hypothetical single program memory where instructions are stored in sequential locations into four modules, corresponding to addresses that are multiples of four (of the hypothetical memory) with an offset of 0, 1, 2, and 3. Thus, in FIG. 6, a first instruction of, say, three 32-bit chunks is stored in location 0 of modules 41, 42, and 43. A next instruction of, say, two 32-bit chunks is stored in location 0 of module 44 and in location 1 of module 41, etc. The actual address (of the hypothetical memory) is presented to address register 45, and the two least significant bits combine to specify the actual starting address of the instruction; that is, the two least significant bit specify the memory module, while the remaining bits specify the location in the memory modules. Accordingly, FIG. 6 shows that register 45 has an eight lead bus at its output, with six of the leads going to the memory modules (through adder circuits 49, 50, and 57) and the two least significant bits going to decoder circuits. To achieve the necessary logic, decoders 46, 47, and 48 are responsive to the two least significant bits of register 45, and the decoder outputs are applied to adders 49, 50, and 57 that connect to modules 41, 42, and 43, respectively.

The instructions stored in modules 41-44 contain information that specifies the instruction's length. Accordingly, format decoder 51 is connected (to the relevant bit of the memory modules' output) and to the two least significant bits of register 45 to determine the length of the instruction. That information is applied to switch 52 and to increment circuit 54. Circuit 54 is also responsive to the output of register 45. In combination with the two least significant bits of register 45, switch 52 directs the outputs of the memory modules to the four outputs, as required, to form a single parallel instruction word (128 bits wide). To allow for a logic "0" output in the unused bits when short instructions are present, switch 52 is shown to include a "0" input. Lastly, to permit access to the memory through other than the incrementing process, such as when the memory is to be loaded with instructions or when a "branch" instruction is to be carried out, FIG. 6 includes a multiplexer 84 interposed between increment circuit 54 and register 45. Multiplexer 84 is also responsive to incoming signals on lines 55, 56, 58, and 59.

Figure 7:
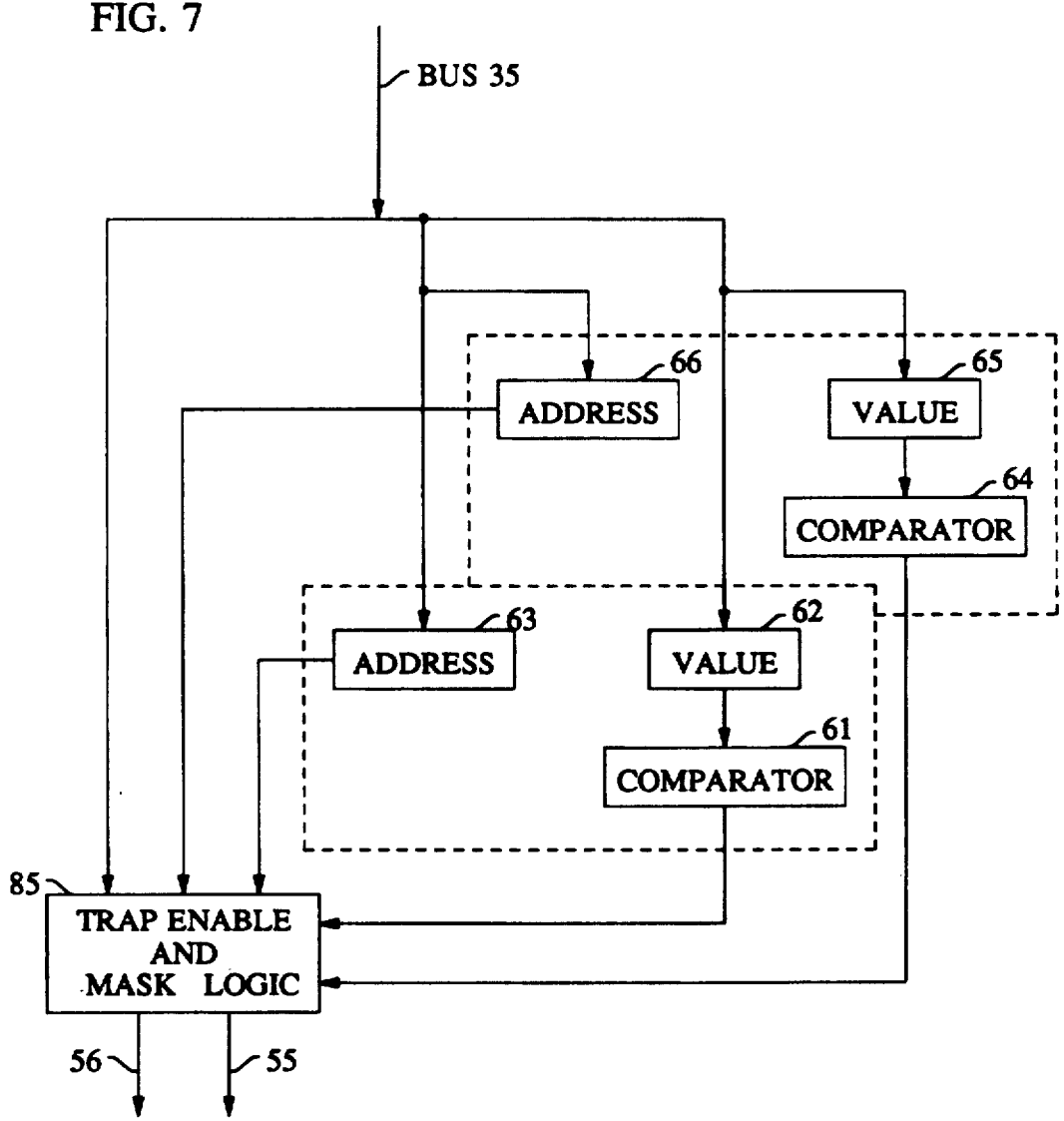
FIG. 7 depicts a portion of the microprogram address control logic of FIG. 5.

Microprogram address control logic 39 (FIG. 5) comprises a trap logic block 60, and a branch logic block 70. All are responsive to bus 35, and combine to provide signals to lines 55 and 56 which feed the multiplexer of the microprogram memory shown in FIG. 6. The trap logic block is illustrated in FIG. 7.

In many applications it might be desirable to test the state of processor 33, and perform different actions based on the processor's state. Such tests may be made at different locations, such as at the register set, at the ALU, and at the memory control block. At each such point of interest, a comparator, a value register, and a trap address register are provided (e.g., 61, 62 and 63) in processor 33. Many such sets can be provided within processor 33, but for sake of simplicity FIG. 7 shows only two sets. The comparator compares observed data to the value stored in the value register. Each comparator produces a "yes/no" response, and its output enters trap controller unit 85. Unit 85 considers each response and makes a decision whether an action should be taken or the processing should continue uninterrupted. A typical action would be to impose the value in the trap address register on the microprogram memory. Unit 85 is responsive to the output signals of the comparators (only comparators 61 and 64 shown) and to the value in the trap address registers (only registers 63 and 66 shown). The trap enable and mask logic block contains a fixed priority designation for the various comparator signals and, in addition, it contains a programmable mask register (loaded from bus 35) that holds the identity of those comparators which are permitted to be "active". The "inactive" comparators are masked out, and are ignored by the trap unit. Based on the activity masking and on the fixed priority, block 85 identifies the highest priority trap that should be responded to and, based on that identification, if any, the value of the appropriate trap address register is passed to line 55, together with a signal on line 56 that controls multiplexer 84.

Branch logic block 70 causes a branch address specified in the currently executing microinstruction to be sent to multiplexer 54 on line 58 (along with a control signal on line 59) provided that any ALU condition (such as, the result of ALU operation being positive) specified in the microinstruction is satisfied at the output of the ALU. Upon the occurrence of the specified condition, multiplexer 84 loads address register 45 with this branch address rather than the increment of the old address, unless a trap is identified by block 60. The details of the branch logic block are perfectly conventional and are, therefore, not described in detail herein.

Register set 37 includes a collection of registers that are used to store various transitory values of the ALU and the memory. For example, registers 37 are involved in circuitry that performs pattern matching by keeping a match pattern in the registers, and comparing the stored values to data obtained from memory 40 in ALU 38.

A pattern match is effected through the use of the trap facility described earlier. Some of the registers contain values to be compared with the current character during a pattern match. The registers contain values to match on such as: "star" which is the Kleene star operator (wild card), "new line" which is the new line character, "end of file" which is the end of file marker, etc. With each cycle, a character is read and compared against a character in the pattern memory. If the current character matches any one of the special values, a trap is generated, and the appropriate address taken. If the comparison is successful, then the pattern index is incremented. If the character does not match the pattern character, then the memory address is incremented. An unsuccessful match may cause the pattern index to be reset to the beginning of the pattern and the pattern memory to be reloaded.

Figure 8:
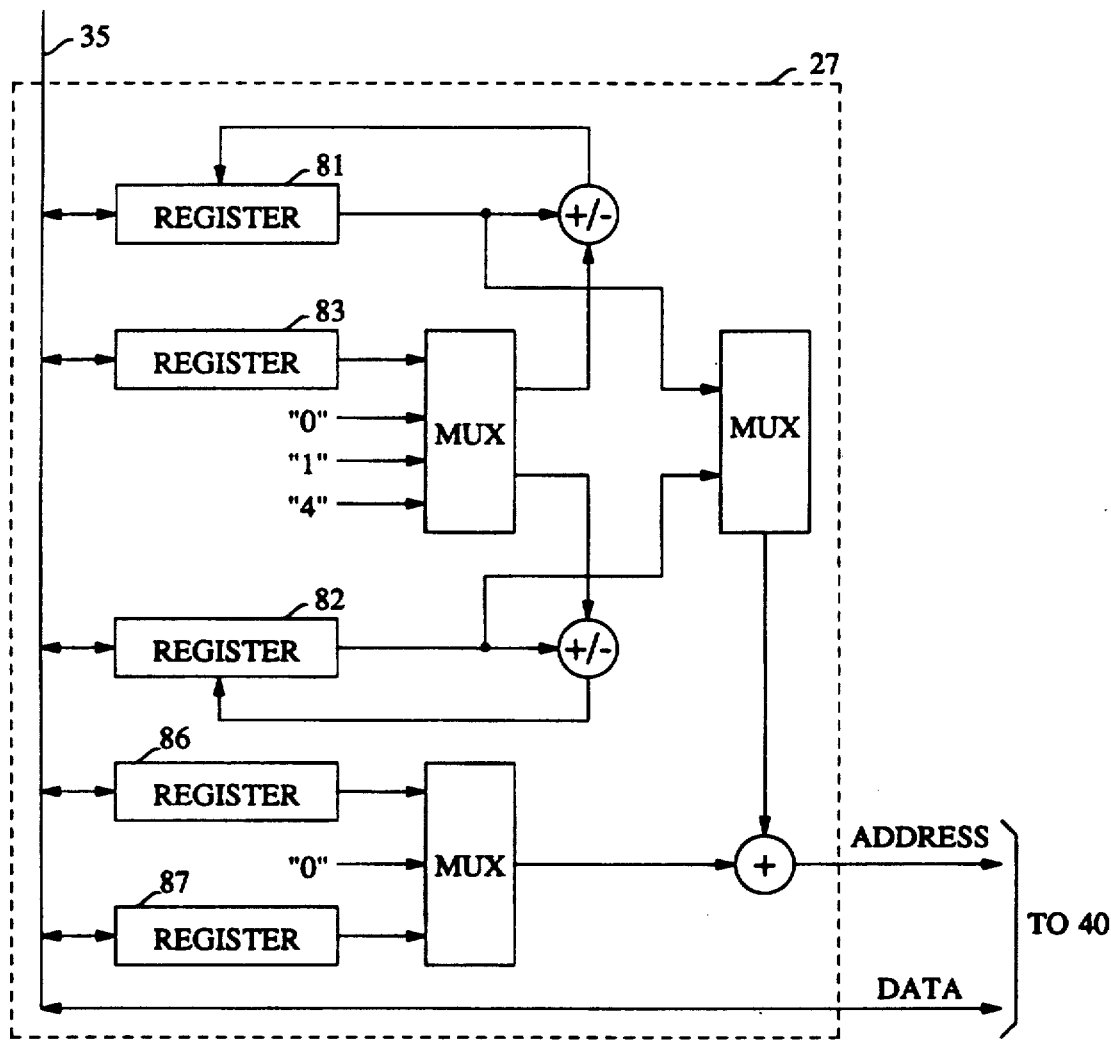
FIG. 8 depicts memory control unit 27.

Memory control 27 is shown in FIG. 8, and consists of two address registers 81 and 82, one increment register 83, and two offset registers 86 and 87. The memory control unit applies an address to the memory 40. This address is computed as the sum of the selected address register and the selected offset. Offsets may come from either offset register, or from the current microinstruction. The result of a memory read is placed on the bus 35, and may be recorded in any of the registers in 37. The source of a memory write may similarly be any of the registers in 37, through the bus 35. Each of the memory address registers 86 and 87 may be incremented or decremented by the amount specified in the current microinstruction. This amount may be 0, 1, 4, or the value of the increment register 83.

The Arithmetic Logic Unit of the processor can be of any conventional design and, therefore, it is not in detail herein.

The following briefly details use of the above-described structure in the context of our invention.

Considering the stack data structure described earlier, it is easily seen that two primary commands are required to manipulate a stack; namely a push, which adds an element to the top of the stack, and a pop, which removes the top element from the stack. Two secondary commands, one to create and initialize a new stack, and another to remove an existing stack, are also needed.

In using our memory system, first, one must locate one or more ASEs that are currently not being used for any other task. Then micro-code to process the desired commands must be down-loaded. The stack pointer is set to point to the first available memory location, which will be treated as the bottom of the stack. The size of each stack element is down-loaded to the ASEs as well, although this information could be hardwired into the micro-code program. After the down-load is completed, the ASEs enter an "accept commands" state. In this state they accept commands to manipulate the stack, including: push, pop, and delete.

One of these ASEs can be denoted as the "head", and all commands will be sent to it. Another of the ASEs can be denoted as the "tail". Each ASE will know the identity of the ASE ahead of it as well as the identity of the ASE behind it in this selected group of ASEs, except for the head which has no predecessor and the tail which has no successor. The head ASE is initially the owner of the current stack pointer. In the event of a stack overflow, that is, if the stack grows to a point where two or more ASEs are needed to hold the stack, one of the head ASE's successors is denoted as the owner of the stack pointer.

When an ASE receives a request to perform a "push", the following things happen: First the ASE checks to see whether it is the owner of the current stack pointer, and if not, the request is relayed to its successor ASE. Eventually, the command will arrive at the ASE that owns the current stack pointer. Then the actual processing begins. The item to be pushed is transferred from network 19 onto the stack. Then the stack pointer is incremented by the size of the item, such that it now points to the next available location once again. Finally, the address of the stack pointer is checked to see if there is sufficient storage to push another item. If there is, the ASE returns a successful completion message to the host. If insufficient space exists, the ASE checks to see if it has a successor. If a successor does not exist, the ASE returns a "need more storage" message to the host. If a successor exists, then the ASE transfers the ownership of the stack pointer to it, and returns a successful completion message to the host. In all cases, the ASE reverts to the accept command state upon completion of the command.

When an ASE receives a request to perform a "pop", the following things happen: First the ASE checks to see whether it is the owner of the current stack pointer, and if not, the request is relayed to its successor ASE. Eventually, the command will arrive at the ASE that owns the current stack pointer. Then the actual processing begins. The stack pointer is decremented so it points to the item at the top of the stack. If this decrement causes the stack pointer to go below the bottom of the stack the request is relayed back to its predecessor, if it exists. If it does not exist, then the ASE returns an underflow error message to the host. Finally, the item to be popped is transferred from the stack into network 19, and transmitted to the host. In all cases, the ASE reverts to the accept command state upon completion of the command.

Deletion of an existing stack allows the allocated ASEs to be reclaimed. It simply involves the marking of each ASE as free.

We claim:

1. A computer including a CPU and a memory, where the memory is characterized by:
   a plurality of storage means for storing information for the CPU and
   a like plurality of programmable processing means, with each of said programmable processing means being fixedly coupled to one storage means of said plurality of storage means and arranged to manipulate data stored in its associated storage means in response to a command from the CPU, to which it is coupled, where the character of the manipulating of data performed by said processing means is defined by a sequence of instructions preloaded by the CPU, and said nature of the manipulating of data being of the type that either causes said processing means to store data in its associated storage means or to retrieve data from is associated storage means.

2. The computer of claim 1 where the data stored in a first of said storage means is related to the data stored in at least one other of said storage means, and the processing of data in the other storage means by its associated processing means is controlled by the processing means of said first of those storage means.

3. A memory system containing a plurality of memory modules, where each of the memory modules comprises:

a memory element; and an associated processing element, with each processing element including means for receiving instructions that define a specified data structure and data structure manipulations on data stored in the associated memory, and means for communicating with processing elements of other memory modules to enlist those other modules in the performance of its specified manipulations on data stored in the memory elements of those other modules.

4. Apparatus for storing information for a host processor comprising:

a communication network for communicating data, structure and command definition information, and command execution information;

a plurality of programmable coder means connected to said communication network including means for communicating data to and from said communication network, means for accepting structure and command definition information and means for accepting command execution information; and storage means associated with each of said coder means.

5. The apparatus of claim 4 wherein each of said coder means includes at least two ports connected to said communication network, and the communicating performed by said coder means includes means for switching connected to said at least two ports for interfacing said programmable coder means with a selected one of said at least two ports.

6. The apparatus of claim 5 wherein said command execution information is related to selected data structure manipulations.

7. The apparatus of claim 4 wherein said communication network includes a second plurality of ports for connecting said plurality of programmable coder means to a third plurality of host computers.

8. The apparatus of claim 4 wherein said communication network includes a second plurality of ports, and a host interface switching network connected to said second plurality of ports.

9. A computer comprising:

a central processing unit; and a memory connected to said processing unit for storing information for the central processing unit, where said memory comprises a plurality of storage means for storing data structures; and a plurality of programmable encoder decoder means each coupled to one of said storage means, for receiving and storing program information that imposes a structure on data of said central processing unit that is stored in the associated storage means and for manipulating said data stored in said associated storage means strictly in accordance with said information, and interconnected to permit communication by said central processing unit with said memory via commands that call for manipulating by said encoder decoder means of said data stored in said storage means.

10. The apparatus of claim 4 wherein said coder includes pattern match hardware comprising:

a pattern memory used to hold the pattern to be matched;

a source of characters to be matched against the pattern; and a comparator that matches the contents of said pattern memory against said source of characters.

11. The apparatus of claim 4 wherein said coder means includes memory for storing data manipulation programs.

12. The apparatus of claim 11 including a processing means for branching said coder means to a selected location in its included memory upon the occurrence of specified conditions in said coder means.

13. The apparatus of claim 11 wherein said included memory stores variable width instructions, said included memory is divided into banks, each of said memory banks produces a word upon a "read" instruction, and the outputs of said memory banks are multiplexed to form an instruction for said coder means.

14. In a memory that is divided into memory blocks, with each memory block including an associated processing means, a method for storing data in said memory, manipulating data in said memory and retrieving data from said memory comprising the steps of:

storing data structure commands in said processing means that characterize a selected set of manipulations of said data; and sending commands to said processing means that specify execution of selected ones of said stored data structure commands.

15. The computer of claim 1 wherein said CPU includes means for preloading different data structure definitions to said plurality of programmable processing means.

16. The computer of claim 15 wherein said nature of the manipulating performed by said processing means is non-uniform among said plurality of processing means.

17. The apparatus of claim 8 wherein said host interface switching network is a switching network adapted to connect one or more CPUs to said communication network.

18. The apparatus of claim 17 wherein said host interface network is further adapted to connect said one or more CPUs to an I/O drive.

19. The apparatus of claim 17 wherein said host interface network is further adapted to connect said one or more CPUs to an additional memory.

20. The apparatus of claim 17 wherein said host interface network is further adapted to connect said one or more CPUs to a controller.

21. The apparatus of claim 17 wherein said host interface network is further adapted to connect said one or more CPUs to a modem.

22. The apparatus of claim 17 wherein said host interface network is further adapted to connect said one or more CPUs to a hard disk.

* * * * *